United States Patent
Doatmas et al.

(10) Patent No.: US 8,027,951 B2
(45) Date of Patent: *Sep. 27, 2011

(54) PREDICTIVE ALGORITHM FOR LOAD BALANCING DATA TRANSFERS ACROSS COMPONENTS

(75) Inventors: Philip M. Doatmas, Tucson, AZ (US); Kenneth F. Day, Tucson, AZ (US); Kenneth W. Boyd, Tucson, AZ (US); John J. Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/044,983

(22) Filed: Mar. 9, 2008

(65) Prior Publication Data

US 2008/0162847 A1     Jul. 3, 2008

Related U.S. Application Data

(62) Division of application No. 10/788,174, filed on Feb. 25, 2004, now Pat. No. 7,475,099.

(51) Int. Cl.
*G06F 7/00* (2006.01)
*G06F 17/00* (2006.01)
(52) U.S. Cl. ......... 707/610; 707/615; 707/626; 707/633
(58) Field of Classification Search .................. None
See application file for complete search history.

(56) References Cited

U.S. PATENT DOCUMENTS

| | | | |
|---|---|---|---|
| 5,504,861 A | 4/1996 | Crockett et al. | |
| 5,615,329 A | 3/1997 | Kern et al. | |
| 5,734,818 A | 3/1998 | Kern et al. | |
| 5,860,137 A | 1/1999 | Raz et al. | |
| 6,003,044 A | 12/1999 | Pongracz et al. | |
| 6,173,306 B1 | 1/2001 | Raz et al. | |
| 6,230,247 B1 | 5/2001 | Cannon et al. | |
| 6,301,643 B1 | 10/2001 | Crockett et al. | |
| 7,328,307 B2 * | 2/2008 | Hoogterp | 711/114 |
| 7,546,354 B1 * | 6/2009 | Fan et al. | 709/219 |
| 2003/0074378 A1 | 4/2003 | Midgley et al. | |
| 2003/0095454 A1 | 5/2003 | Reed et al. | |
| 2004/0230787 A1 * | 11/2004 | Blumenau et al. | 713/1 |
| 2006/0053178 A1 | 3/2006 | van Ingen et al. | |

* cited by examiner

*Primary Examiner* — Jay A Morrison
(74) *Attorney, Agent, or Firm* — Dan Shifrin

(57) ABSTRACT

A system, backup components and computer program product are provided to improve the efficiency of the transmission of consistency groups across multiple storage components by ensuring that volume transactions are evenly allocated among backup components. Each volume is initially assigned to a specified backup component. Once a color period begins, volume transactions are transmitted to the assigned backup component. Each backup component accumulates data transfer information for its assigned volumes throughout at least a portion of the color period and calculates a new volume assignment for the next color period. Before the start of the next color period, a captain storage controller transmits any new assignments to the backup components. During a next color period, the process is repeated using the new assignments.

20 Claims, 3 Drawing Sheets

PREDICTIVE ALGORITHM FOR LOAD BALANCING DATA TRANSFERS ACROSS COMPONENTS

RELATED APPLICATION DATA

The present application is a divisional application of, and claims the priority benefit of, commonly-assigned and co-pending U.S. application Ser. No. 10/788,174, entitled PREDICTIVE ALGORITHM FOR LOAD BALANCING DATA TRANSFERS ACROSS COMPONENTS, filed on Feb. 25, 2004, which application is hereby incorporated herein by reference in its entirety.

TECHNICAL FIELD

The present invention relates generally to the transfer of data within a data storage system and particularly to balancing such transfers among components in the data storage system.

BACKGROUND ART

Disaster recovery systems typically address two types of failures: a sudden catastrophic failure at a single point in time, or data loss over a period of time. In both types of failure scenario, updates to volumes may be lost. To assist in recovery of data updates, a copy of data may be provided at a remote location. Such dual or shadow copies are typically made as the application system is writing new data to a primary storage device. International Business Machines Corporation (IBM®), the assignee of the subject patent application, provides the following systems for maintaining remote copies of data at a secondary site, Extended Remote Copy (XRC) and Peer-to-Peer Remote Copy (PPRC). These systems provide a method for the continuous mirroring of data to a remote site to failover to during a failure at the primary site from which the data is being continuously mirrored. Such data mirroring systems can also provide an additional remote copy for non-recovery purposes such as local access at a remote site. These IBM XRC and PPRC systems are described in the IBM publication "Remote Copy: Administrator's Guide and Reference," IBM document number SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing data from the primary DASD. A primary storage controller may be provided to control access to the primary DASD and a secondary storage controller may be provided to control access to the secondary DASD. In the IBM XRC environment, the application system writing data to the primary volumes includes a sysplex timer which provides a time-of-day (TOD) value as a time stamp to data writes. The host system time stamps data sets when writing such data sets to volumes in the primary DASD. The integrity of data updates is related to insuring that updates are done at the secondary volumes in the volume pair in the same order as they were done on the primary volume. In XRC and other prior art systems, the cross systems common time stamp provided by the system on behalf of the application program determines and maintains the logical sequence of data updates across any number of data volumes on any number of storage systems. In many application programs, such as database systems, certain writes cannot occur unless a previous write occurred; otherwise the data integrity would be jeopardized. Such a data write whose integrity is dependent on the occurrence of a previous data write is known as a dependent write. For instance, if a customer opens an account, deposits $400.00, and then withdraws $300.00, the withdrawal update to the system is dependent on the occurrence of the other writes, i.e., the opening of the account and the deposit. When such dependent transactions are copied from the primary volumes to the secondary volumes, the transaction order must be maintained to maintain the integrity of the dependent write operation.

Volumes in the primary and secondary DASDs are consistent when all writes have been transferred in their logical order, i.e., all writes have been transferred before the writes which are dependent upon them. In the banking example, this means that the deposit is written to the secondary volume before the withdrawal. A consistency group is a collection of updates to the primary volumes such that dependent writes are secured in a consistent manner. For instance, in the banking example, this means that the withdrawal transaction is in the same or a later consistency group as the deposit; the withdrawal cannot be in an earlier consistency group. Consistency groups maintain data consistency across volumes, storage devices and storage systems. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal to or earlier than the consistency time stamp. In the IBM XRC environment, the consistency time is the latest time to which the system guarantees that updates to the second volume are consistent. If all the records in the consistency group are written to secondary volumes during a period of time referred to as a "color period", then the reported consistency time reflects the latest time stamp of all records in the consistency group. Methods for maintaining the sequential consistency of data writes and forming consistency groups to maintain sequential consistency in the transfer of data between a primary DASD and secondary DASD are described in commonly assigned U.S. Pat. Nos. 5,615,329 and 5,504,861 which are incorporated herein by reference in their entirety.

Within a consistency group, redundant data may be eliminated because only the latest version of a block need be retained. However, when data is spread across multiple components, it may be difficult to coordinate the elimination of redundant data unless the final compilation for each volume is handled by a single backup component. Commonly assigned and co-pending U.S. patent application Ser. No. 10/618,242, entitled "AUTONOMIC LINK OPTIMIZATION THROUGH ELIMINATION OF UNNECESSARY TRANSFERS" and filed on Jul. 11, 2003, is incorporated herein by reference and describes the process of ensuring that a single backup component receives all of the data for a particular volume during a particular color. Additionally, the amount of data received by a backup component may be disproportionately large relative to the amount of data received by other backup components, thereby increasing the time to transfer all of the volumes to all of the backup components.

Thus, a need exists to improve the efficiency of the transmission of consistency groups across multiple storage components.

SUMMARY OF THE INVENTION

The present invention provides a system, backup components and computer program product to improve the efficiency of the transmission of consistency groups across multiple storage components by ensuring that volume transactions are evenly allocated among backup components. Each volume is initially assigned to a specified backup component. Once a color period begins, volume transactions are transmitted to the assigned backup component. Each backup component accumulates data transfer information for its assigned volumes throughout at least a portion of the color period. Before the start of the next color period, a captain backup component retrieves this data transfer information, calculates a new volume assignment for the next color period, and transmits any new assignments to the backup components. During a next color period, the process is repeated using the new assignments.

DETAILED DESCRIPTION OF THE PREFERRED EMBODIMENT

In the following description, reference is made to the accompanying drawings which form a part hereof and which illustrates several embodiments of the present invention. It is understood that other embodiments may be utilized and structural and operational changes may be made without departing from the scope of the present invention.

Figure 1:
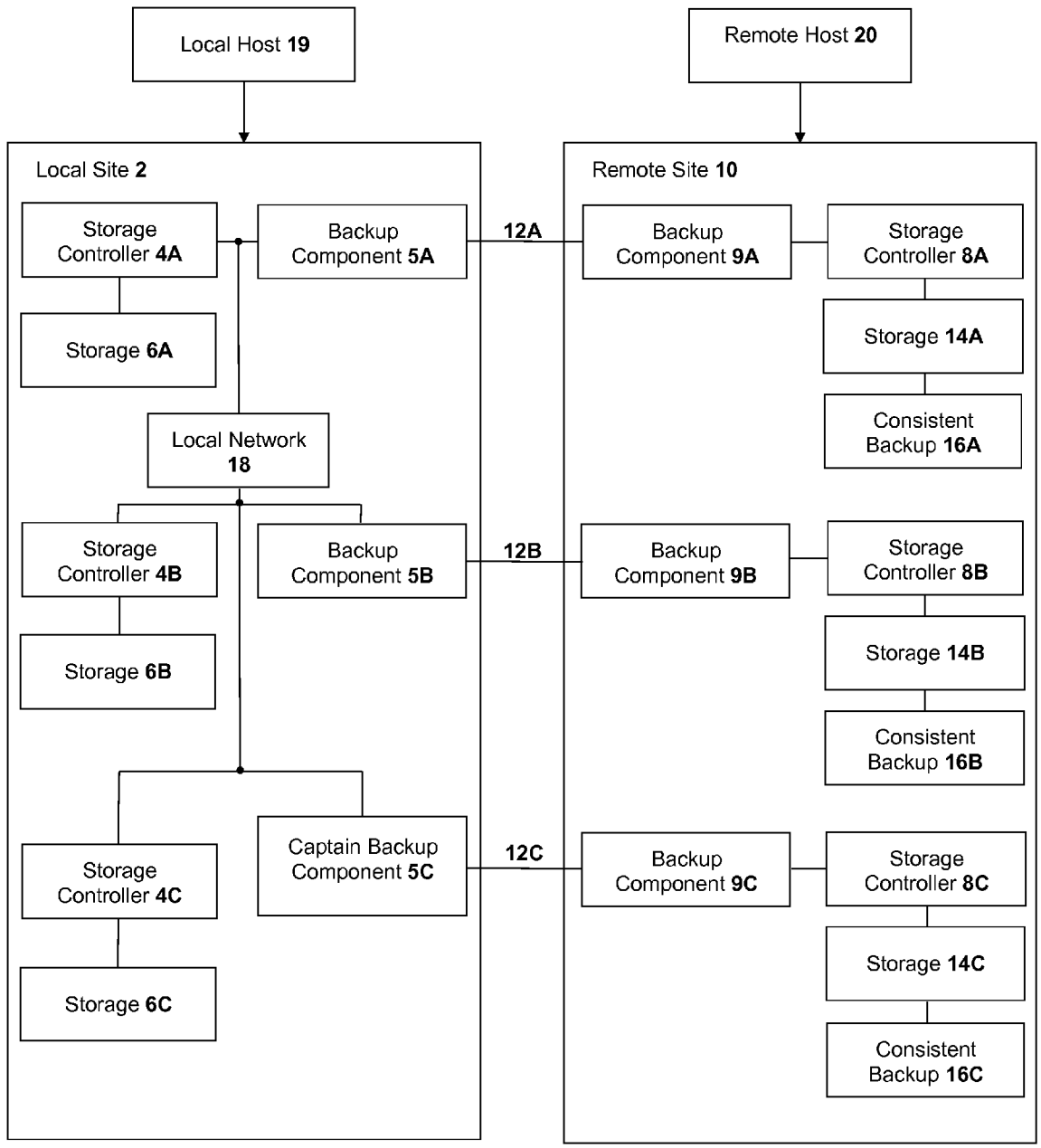
FIG. 1 is a block diagram illustrating a network computing environment in which aspects of the invention are implemented.

FIG. 1 illustrates a network computing environment in which aspects of the invention may be implemented. A local site 2 includes storage controllers 4A, 4B, 4C coupled to attached storage systems 6A, 6B, 6C, respectively. The storage controllers 4A, 4B, 4C manage input/output (I/O) access to volumes in the storage systems 6A, 6B, 6C from local host 18. Each storage controller 4A, 4B, 4C copies data to a corresponding local backup components 5A, 5B, 5C, respectively. Each local backup component 5A, 5B, 5C copies data to a remote backup component 9A, 9B, 9C, respectively, at a remote site 10 via connections 12A, 12B, 12C. The local backup components 5A, 5B, 5C transmit data consistent as of a point of time to the remote backup components 9A, 9B, 9C, where remote storage controllers 8A, 8B, 8C store the data to respective attached remote storage systems 14A, 14B, 14C. In certain implementations, the local backup components 5A, 5B, 5C continuously transmit data to the remote site 10, and at certain instances in time will ensure the consistency of the data at the remote site 10. In certain implementations, the remote site 10 may save a consistency group of data to another storage, such as consistent backup storages 16A, 16B, 16C to maintain a backup of the consistent data at the remote site 10. After a consistent group of data is transmitted to the remote storage 14A, 14B, 14C, a copy is made from remote storage 14A, 14B, 14C to a respective consistent backup storage 16A, 16B, 16C. Although FIG. 1 illustrates a certain number of components at the sites, such as three sets of storage controllers, storage systems and backup components, the described implementations may operate with any number of storage controllers, storage systems and backup components at the sites. Moreover, through use of network connections, any local backup component 5A, 5B, 5C may be connected to any remote backup component 9A, 9B, 9C.

The remote site 10 may be hundreds or thousands of miles from the local site 2. The connections 12A, 12B, 12C between pairs of backup components may comprise a dedicated line, such as a dedicated fiber optical network or connection maintained by a long distance telecommunication carrier, long distant fiber optic connection having channel extenders, or extend through a network such as a storage area network (SAN), local area network (LAN), the internet, an intranet, etc.

The local host 19 at the local site 2 may perform I/O operations with respect to volumes in the local storage systems 6A, 6B, 6C. The local host 19 may communicate with storage controllers 4A, 4B, 4C via any network or connection known in the art. The storage controllers 4A, 4B, 4C at the local site may have certain relationships with respect to the volumes managed by the storage controllers. One backup component may be designated as a "captain", e.g., 5C. The captain backup component may accumulate information about volumes as transactions are written as well as assign volume ownership to back-up components 9A, 9B, 9C.

The storage controllers 4A, 4B, 4C and remote storage controllers 8A, 8B, 8C further include a processor complex and may comprise any storage controller or server known in the art such as the IBM Enterprise Storage Server® (ESS), 3990 Storage Controller, etc. The local storage systems 6A, 6B, 6C, remote storage systems 14A, 14B, 14C and backup storage systems 16A, 16B, 16C may comprise an array of storage devices such as just a bunch of disks (JBOD), redundant array of independent disks (RAID), virtualization device, etc.

The local storage controllers 4A, 4B, 4C and backup components 5A, 5B and 5C may communicate over a local network 18 which may comprise direct connections or a switched network. Alternatively, the storage controllers 4A, 4B, 4C and backup components 5A, 5B and 5C may communicate over links 12A, 12B, 12C to the remote site 10 if the links also extend through a network at the local site 2.

Figure 2:
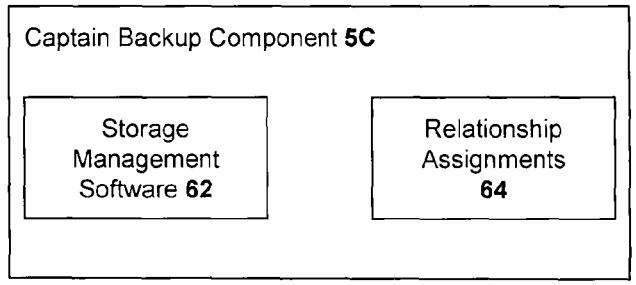
FIG. 2 illustrates an arrangement of a storage controller in accordance with implementations of the present invention.

FIG. 2 illustrates programs and information that may be included in the captain backup component 5A at the local site 2, including storage management software 62 and relationship assignment information 64. The storage management software 62 may include code to assign each volume to backup component in the remote site 10, compile information about the capacity of each backup component as volume transactions are transmitted to the assigned backup components, and reassign volumes as appropriate in order to more evenly balance the load among the backup components.

Figure 3A:
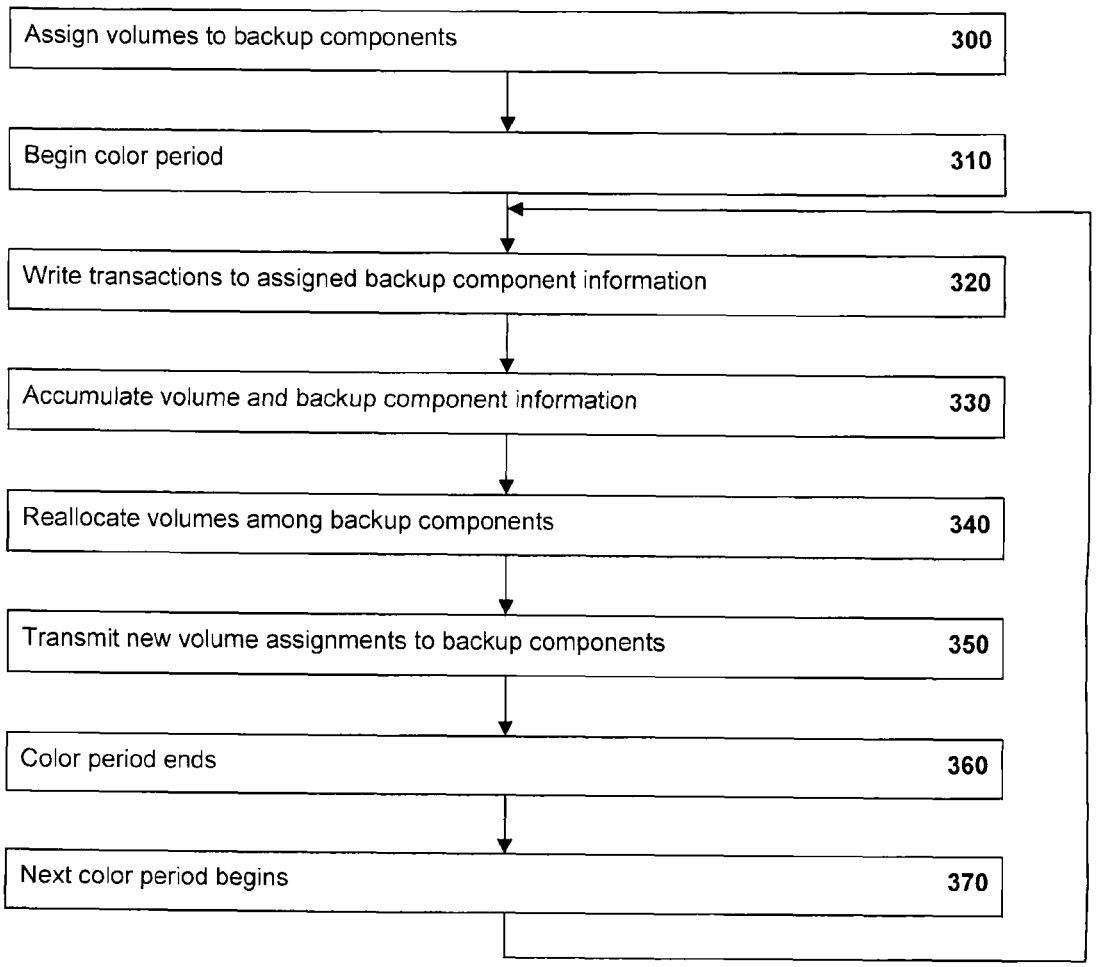
FIGS. 3A and 3B are flow charts of operations performed by storage controllers to manage load balancing in accordance with the present invention.

FIG. 3A is a flow chart illustrating operations performed by the captain backup component 5C, to manage volume assignments and load balancing. Each volume is initially assigned to a specified backup component (step 300). The initial assignment may be performed arbitrarily because no history has yet been accumulated on which to base more refined assignments. One such method of initial assignments is to distribute volumes evenly across all of the backup components. Volume transactions are then written to the assigned backup components during a color period (steps 310, 320). While the color period continues, each backup component accumulates data transfer information for its assigned volumes. The captain backup component 5C collects the volume by volume information from the backup components and determines whether any backup components are receiving more than a proportionate share of the volumes (step 330). Such accumulation continues for a predetermined period which may be shorter than the full color period. Before the beginning of the next color period, the captain backup component 5C performs a reallocation of volume assignments to more evenly distribute the volumes across the backup components during the next color period (step 340). For example, the captain backup component 5C may reassign a first volume to the backup component to which the smallest percentage of expected work has already been assigned. Similarly, the next volume is reassigned to the backup component to which the smallest percentage of expected work has then already been assigned, and so forth until all of the volumes have been reassigned. Before the color period has completed (step 360), all backup components briefly pause in a point-in-time consistent manner and the captain backup component 5C transmits new assignments (if any) (step 350). After the first color periods ends, the next color period may commence (step 370) and the backup components resume receiving transactions based on any new assignments. During each subsequent color period, the captain backup component 5C may adaptively re-assign volumes as conditions change (steps 320-370).

Figure 3B:
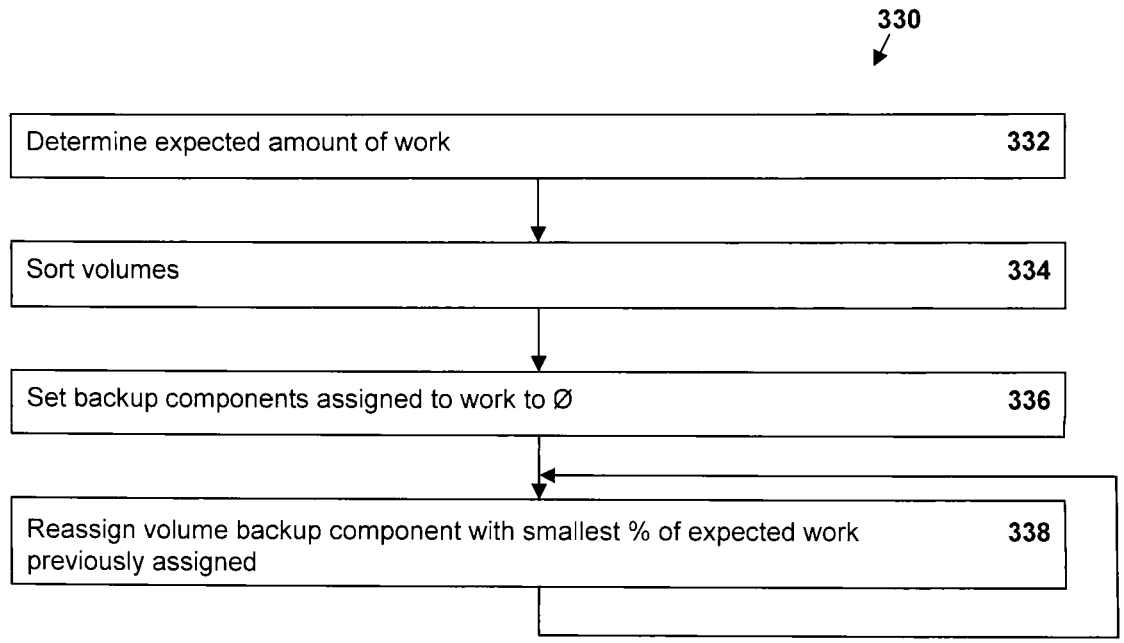

In a more detailed description of the forgoing method of reassigning volume ownership (step 320) illustrated in the flow chart of FIG. 3B, the captain backup component 5C uses the volume by volume data transfer information and any previously acquired knowledge to determine the expected amount of work for each volume for the next color period (step 332). The volumes are sorted in order of the expected amount of work for the next color period (step 334). The amount of work assigned to each backup component is set to zero (step 336). Volumes may then be reassigned to backup components based upon the expected amount of work of each backup component (step 338). The algorithm attempts to minimize the time it will take the backup component with the most work to do to send its transaction data to the secondary backup component. The optimal distribution of work is such that each backup component does exactly the same amount of work, and thus no backup component is ever idle.

The captain assigned may also maintain a record of historical trends in the amount of data received for each volume over several color periods. For example, volume A may have received 50% of the data during the first color period, 40% during the second and 30% during the third. The captain assigned may assume that the relative amount of data received by volume A during the fourth color period would be still less, such as 20%, and determine an ownership assignment according to the assumption.

In an alternative arrangement, no single backup component functions as the captain. Rather, the backup components may be configured to obtain the information about how much data has been received for each volume. A reassignment algorithm is then executed by each backup component, with each examining the volumes in the same order so that each backup component generates the same re-assignments. Re-assignment of volumes may then be performed independently by each backup component.

The described techniques to form consistency groups may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media such as network transmission line, wireless transmission media, signals propagating through space, radio waves, infrared signals, etc. Of course, those skilled in the art will recognize that many modifications may be made to this configuration without departing from the scope of the implementations and that the article of manufacture may comprise any information bearing medium known in the art.

The above implementations were described with respect to a specific environment. However, the described implementations for maintaining consistency during recovery processes could be applied to maintain consistency in other computing and vendor environments and using other data copying protocols and programs than described herein.

In certain implementations, data in the storage devices is arranged in volumes. In alternative systems, the storage areas on which data is maintained may be grouped according to storage units other than volumes that are grouped in groupings other than sessions for the purpose of maintaining consistency.

The illustrated logic of FIGS. 3A and 3B show certain events occurring in a certain order. In alternative implementations, certain operations may be performed in a different order, modified, or removed. Moreover, steps may be added to the above described logic and still conform to the described implementations. Further, operations described herein may occur sequentially or certain operations may be processed in parallel. Yet further, operations may be performed by a single processing unit or by distributed processing units.

Figure 4:
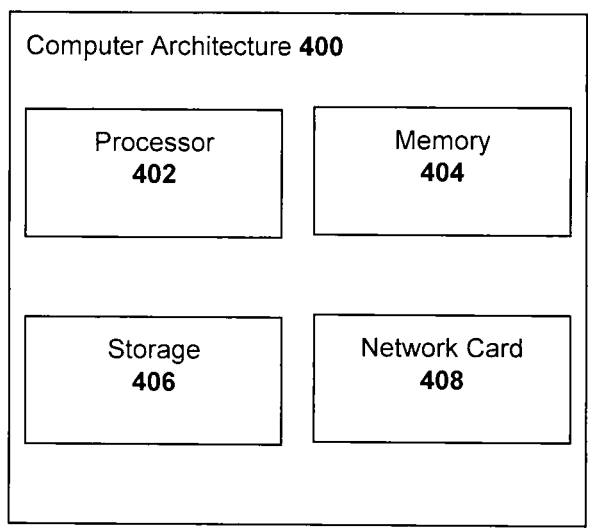
FIG. 4 illustrates an architecture of computing components in the network environments, such as the storage controllers, used with implementations of the present invention.

FIG. 4 illustrates one implementation of a computer architecture 400 of the network components such as the storage controllers shown in FIG. 1. The architecture 400 may include a processor 402 (e.g., a microprocessor), a memory 404 (e.g., a volatile memory device), and storage 406 (e.g., a non-volatile storage such as magnetic disk drives, optical disk drives, a tape drive, etc.). The storage 406 may comprise an internal storage device or an attached network accessible storage. Programs in the storage 406 are loaded into the memory 404 and executed by the processor 402 in a manner known in the art. The architecture further includes a network card 408 to enable communication with a network. An input device 410 is used to provide user input to the processor 402 and may include a keyboard, mouse, pen-stylus, microphone, touch sensitive display screen, or any other activation or input mechanism known in the art. An output device 412 is capable of rendering information transmitted from the processor 402 or other component such as a display monitor, printer, storage, etc.

The foregoing description of various implementations of the invention has been presented for the purposes of illustration and description. It is not intended to be exhaustive, nor to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A data replication system, comprising:
   a plurality of local primary components;
   a like plurality of local backup components each coupled to a corresponding local primary component and to a corresponding remote backup component to which the local backup component copies data; and
   one of the local backup components being designated a captain backup component and coupled to the local primary components and to the local backup components, the captain backup component programmed for:
   initially assigning to each of the plurality of local backup components one or more of a plurality of data volumes to be received from the corresponding local primary component;
   determining the amount of data received by each local backup component received from the corresponding local primary component during a predetermined period; and
   re-assigning to each of the plurality of local backup components one or more of the plurality of data volumes in response to the amount of data received by each local backup component.

2. The data replication system of claim 1, wherein initially assigning to each of the plurality of local backup components one or more of a plurality of data volumes comprises assigning to each of the local backup components an approximately equal percentage of the volumes.

3. The data replication system of claim 1, wherein re-assigning to each of the plurality of local backup components one or more of the plurality of data volumes comprises:
   sorting the volumes by an expected amount of work;
   setting all of the local backup components' assigned work to zero;
   re-assigning a volume with the greatest amount of expected work to the local backup component which has been assigned the smallest amount of expected work; and
   repeating the re-assignment until all volumes have been assigned.

4. The data replication system of claim 1, wherein the captain backup component is further programmed for:
   maintaining records of volume usage during the transmission of each of a plurality of blocks of transactions; and
   identifying any usage trends for any volume.

5. The data replication system of claim 4, wherein the captain backup component is further programmed for:
   anticipating that any identified trend will continue during the transmission of a next block of transactions; and
   re-assigning volumes in accordance with any identified trends.

6. A backup component, comprising:
   means for initially assigning to each of a plurality of local backup components one or more of a plurality of data volumes of a first block of transactions from at least one local primary component, each of the transactions associated with one of the plurality of data volumes, each of the transactions of the first block to be transmitted to the local backup component to which the associated volume is assigned and further to be copied the local backup component to a corresponding remote backup component;
   means for determining the amount of data received by each local backup component from the corresponding local primary component during a predetermined period; and
   means for re-assigning to each of the plurality of local backup components one or more of the plurality of data volumes in response to the amount of data received by each local backup component.

7. The backup component of claim 6, wherein the means for initially assigning to each of the plurality of local backup components one or more of a plurality of data volumes comprises means for assigning to each of the local backup components an approximately equal percentage of volumes.

8. The backup component of claim 6, wherein the means for re-assigning to each of the plurality of local backup components one or more of the plurality of data volumes comprises:
   means for sorting the volumes by an expected amount of work;
   means for setting all local backup components' assigned work to zero;
   means for re-assigning a volume with the greatest amount of expected work to the local backup component which has been assigned the smallest percentage of expected work; and
   means for repeating the re-assignment until all volumes have been assigned.

9. The backup component of claim 6, further comprising:
   means for maintaining records of volume usage during the transmission of each of a plurality of blocks of transactions; and
   means for identifying any usage trends for any volume.

10. The backup component of claim 9, further comprising:
    means for anticipating that any identified trend will continue during the transmission of a next block of transactions; and
    means for re-assigning volumes in accordance with any identified trends.

11. A first local backup component, comprising:
    means for receiving a plurality of data transactions of a first block of transactions for a predetermined period from at least one local primary component, each transaction being associated with one of a plurality of data volumes assigned to the first local backup component;
    means for copying the data transactions from the first local backup component to the first remote backup component;
    means for tracking the amount of data received by the first local backup component and other local backup component to which other volumes were assigned, the data being copied from the other local backup components to corresponding remote backup components;
    means for re-assigning to the first local backup component one or more of the plurality of data volumes in response to the amount of data received for each assigned volume by each local backup component; and
    means for receiving a plurality of data transactions of a second block of transactions from at least one local primary component, each transaction being associated with one of the plurality of volumes re-assigned to the first local backup component.

12. The first local backup component of claim 11, further comprising means for initially assigning to the first local backup component an approximately equal percentage of volumes relative to the data volumes assigned to each of the other local backup components.

13. The first local backup component of claim 11, wherein the means for re-assigning to the first local backup component one or more of the plurality of data volumes comprises:
- means for sorting the volumes by an expected amount of work;
- means for setting each of the local backup components' assigned work to zero;
- means for re-assigning a volume with greatest amount of expected work to the first local backup component if the first local backup component has the smallest percentage of expected work previously assigned relative to the expected work previously assigned to other local backup components; and
- means for repeating the reassignment until all volumes have been reassigned to the first local backup component and to the other local backup components.

14. The first local backup component of claim 11, further comprising:
- means for maintaining records of volume usage during the transmission of each of a plurality of blocks of transactions from the at least one local primary component; and
- means for identifying any usage trends for any volume.

15. The first local backup component of claim 14, further comprising:
- means for anticipating that any identified trend will continue during the transmission of a next block of transactions; and
- means for re-assigning volumes in accordance with any identified trends.

16. A computer program product of a computer readable medium usable with a programmable computer, the computer program product having computer-readable code embodied therein for balancing loads of backup components in a data storage system having a plurality of local primary components each coupled to a corresponding local data backup component, the computer-readable code comprising instructions for:
- initially assigning to each of the plurality of local backup components one or more of a plurality of data volumes of a first block of transactions from at least one local primary component, each of the transactions associated with one of the plurality of data volumes;
- transmitting a plurality of data transactions of a first block of transactions from at least one local primary component to the local backup component to which the associated volume is assigned;
- copying the data transactions from each local backup component to corresponding remote backup components;
- continuing transmitting and copying transactions or the first block for a predetermined period;
- determining the amount of data received by each local backup component during the predetermined period;
- re-assigning to each of the plurality of local backup components one or more of the plurality of data volumes in response to the amount of data received by each backup component; and
- transaction a plurality of data transactions of a second block of transactions from at least one local primary component, each of the transmitted transactions of the second block being transmitted to the local backup component to which the associated volume is re-assigned and copied to the corresponding remote backup component.

17. The computer program product of claim 16, wherein the instructions for initially assigning to each of the plurality of local backup components one or more of a plurality of data volumes comprise instructions for assigning the volumes evenly across the local backup components.

18. The computer program product of claim 16, wherein the instructions for re-assigning to each of the plurality of local backup components one or more of the plurality of data volumes comprise instructions for:
- sorting the volumes by an expected amount of work;
- setting all of the local backup components' assigned work to zero;
- re-assigning the unassigned volume with the greatest amount of expected work to the local backup component which has been assigned the smallest amount of expected work; and
- repeating the re-assignment until all volumes have been assigned.

19. The computer program product of claim 16, further comprising instructions for:
- maintaining records of volume usage during the transmission of each of a plurality of blocks of transactions; and
- identifying any usage trends for any volume.

20. The computer program product of claim 19, further comprising instructions for:
- anticipating that any identified trend will continue during the transmission of a next block of transactions; and
- re-assigning volumes in accordance with any identified trends.

* * * * *